Figure 1:
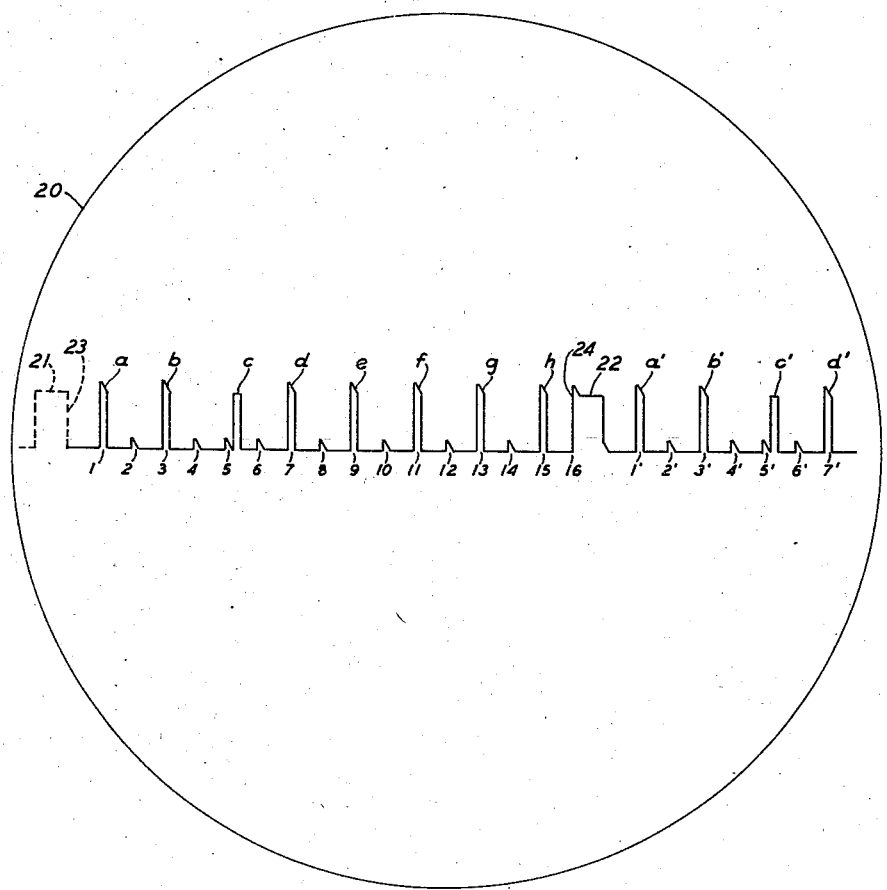

Jan. 13, 1948.  J. O. EDSON  2,434,264
CATHODE-RAY OSCILLOSCOPE CIRCUIT WITH TIMING MARKS
Filed Oct. 17, 1944  2 Sheets-Sheet 1

INVENTOR
J. O. EDSON
BY *O. MacKenzie*

AGENT

Patented Jan. 13, 1948

2,434,264

UNITED STATES PATENT OFFICE 2,434,264

CATHODE-RAY OSCILLOSCOPE CIRCUIT WITH TIMING MARKS

James O. Edson, Great Kills, N. Y., assignor to Bell Telephone Laboratories, Incorporated, New York, N. Y., a corporation of New York Application October 17, 1944, Serial No. 559,088

10 Claims. (Cl. 315—22)

This invention relates to an improvement in cathode-ray oscilloscope circuit with timing marks, particularly useful where it is desired to represent by a stationary pattern on the oscilloscope screen, a recurrent phenomenon with accurately positioned indicia subdividing the time interval between successive recurrences of the phenomenon to be studied.

An occasion for the use of the invention is found in the adjustment in time of the individual channels of a multiplex system of pulse position modulation, for example, one such as described in United States Patent 2,262,838, granted November 18, 1941 to E. M. Deloraine et al. In one channel of such a system, intelligence is transmitted by varying the instant of occurrence of the pulse associated with that channel so that a pure tone to be transmitted shall appear as a pulse of unchanging magnitude and duration but varying in time of occurrence sinusoidally about a mean instant, the same in each of a succession of recurrent groups of transmitted pulses individually corresponding to a transmission channel. In order that the permissible modulation in position of all channel pulses shall be the same, it is requisite that the mean instants of pulse recurrence shall be uniformly spaced in the interval available between successive groups, namely, that between the end of a marker pulse initiating one group and the beginning of the marker pulse initiating the next succeeding group of channel pulses. This spacing may be conveniently studied by comparison with the subdividing indicia of the present invention.

One object of the invention therefore is to provide a cathode-ray oscilloscope circuit whereby it is possible to represent as a steady pattern on the oscilloscope screen recurrent groups of phenomena and to determine accurately the placement in time of the individual unmodulated pulses of a transmission system employing pulse position modulation.

Further, it is often desired to study a particular channel of a multiplex system of the kind referred to. For this purpose the scale of the oscilloscope pattern needs to be expanded and controlled in position so that some one pulse may be enlarged and examined in the most suitable position on the oscilloscope screen. The circuit disclosed later herein provides for doing this, which is also an object of the invention.

While the invention will be described with reference to an eight channel multiplex pulse position modulation system for communication purposes, it will be understood that this is only one example, and that the invention is generally applicable to the temporal subdivision of a time interval determined by the regular recurrence of any event whatsoever, provided the recurrence of that event may be represented by a voltage pulse, and this is generally the object of the invention.

Figure 2:
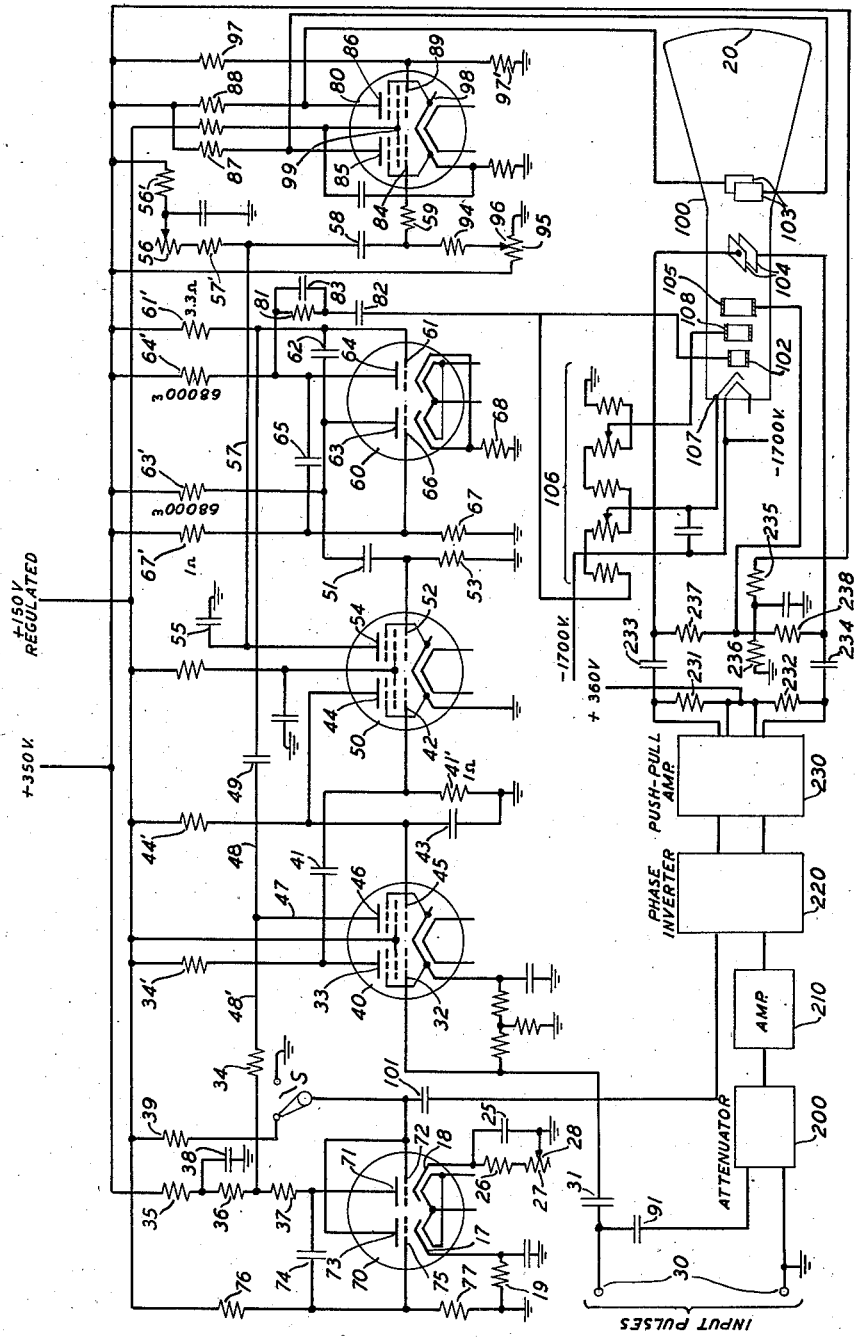

The invention itself may be understood from the following description illustrated by the accompanying drawings, in which:

Fig. 1 diagrammatically represents the recurrent groups of marker and channel pulses involved in the multiplex system chosen to exemplify the application of the invention, together with the subdividing indicia; and Fig. 2 is a diagram of the circuit of the invention, in which are symbolically represented certain elements not themselves a part of the present invention.

In each figure, like elements and features are identified by like numerals.

It will be assumed that the multiplex transmitter of a pulse position modulation system of eight transmission channels is to be tested and that in the operation of that system there are produced pulse groups recurring some 8,000 times per second, each group comprising a marker pulse followed at nominally equal intervals by eight channel pulses individually representing the eight transmission channels and each of one-fourth the duration of the marker pulse. If each marker pulse is 4 microseconds long the time interval between the end of one and the beginning of the next marker is about 120 microseconds. The centers of the eight channel pulses, each 1 microsecond long and nominally uniformly distributed in the 120-microsecond interval, therefore occur at 15-microsecond intervals, thus leaving 14 microseconds clear between consecutive channel pulses, so that full modulation of each channel permits a shift in pulse position of 7 microseconds. The adjustment of the multiplex transmitter to provide this equal spacing of the channel pulses is not here described, inasmuch as the present invention relates only to the inspection of the pulse spacing. If the centers of the pulses are inaccurate to 1 microsecond, and two consecutive pulse centers are oppositely displaced by this interval from their nominal occurrences, their channels will interfere unless their position modulations are restricted to 3 decibels below the normal level. The importance of the inspection made possible by the present invention will be obvious.

Referring to Fig. 1, there is shown on oscilloscope screen 20 the inspection pattern provided by the testing circuit of Fig. 2. As vertical displacements of a cathode-ray beam sweeping left to right on screen 20, there appear eight channel pulses following marker pulse 21, represented at *a* to *h* inclusive, while only four channel pulses, *a'* to *d'* inclusive, are shown for the group following marker pulse 22. The total time interval included by the pattern shown in Fig. 1 is some 190 microseconds, about one and a half cycles of recurrence. The reason for this limitation will be given later. Marker pulse 21 is shown in dotted line; it is not actually displayed on the screen as will be later explained.

Correct adjustment of the transmitter corresponds to a uniform spacing of pulses *a* to *h*, inclusive, in the interval between ending 23 of pulse 21 and beginning 24 of pulse 22. In the pattern of Fig. 1, it will be noted that all the channel pulses but *c* (and *c'*) are properly located in time, and that the leading edge of each channel pulse except *c* (and *c'*), as well as of marker pulse 22, is surmounted by a short additional pulse such as occurs also in the center of each pulse interval. There are for each group of channel pulses 16 of these short pulses, which are the indicia subdividing the interval 23—24 into 16 equal parts, two for each channel pulse interval. Numerals 1 through 16 designate the indicial pulses for the channel pulse group following marker 21, while numerals 1' through 7' designate the exactly similar indicial pulses for the channel pulses following marker 22, so far as the latter group is represented on screen 20.

Reference is now made to Fig. 2 in the description of the circuit of the invention and its operation to produce, on oscilloscope screen 20, the pattern shown in Fig. 1. At terminals 30 groups of positive pulses are received from the multiplex transmitter. If the transmitter pulses are negative, they are inverted in sign by any convenient known means before being applied to terminals 30. Through condenser 31 these pulses are applied to control grid 32 of the left half of tube 40, conveniently a 12L8GT, and continuously conducting. There results at anode 33 of this section of tube 40 an amplified negative pulse which is transferred through condenser 41 (1,000 micromicrofarads) to control grid 42 of the left half of tube 50, also a 12L8GT. The left sections of tubes 40 and 50 serve, respectively, as a pulse amplifier and a selector of the marker pulse (21 of Fig. 1). The latter tube operates without grid bias and is conducting until the amplified negative pulses from anode 33 appear on grid 42, between which and ground is connected grid leak 41'. Then anode current of the marker selector is cut off and 100 micromicrofarad condenser 43, connected between ground and anode 44 of tube 50, charges positively at the rate of about 8 volts per microsecond during the continuance of the negative pulses on grid 42. Since the marker pulse lasts about four times as long as the succeeding channel pulses, the voltage rise it occasions on condenser 43 is much greater than that due to the channel pulses themselves. The marker pulse may therefore be separated from the channel pulses.

To the junction of anode 44 and condenser 43 is connected control grid 45 of the right-hand section of tube 40. This section, to be called the marker amplifier, operates with a 30-volt negative grid bias derived from the cathode current of the amplifier section of the same tube. Condenser 43 is charged, when the anode current of the marker selector is cut off, to about 32 volts positive (4 microseconds×8 volts per microsecond), and this voltage on grid 45 renders the marker amplifier conducting. The much lower voltage which the channel pulses indirectly confer on condenser 43 have no such effect. At the end of the marker pulse, condenser 43 is discharged to ground through the anode-cathode path of the marker selector, the left-hand section of tube 50. Accordingly, the timing circuit and the pulsing circuit presently to be described are controlled only by the marker pulse, their operation starting at the end of pulse 21.

The conductivity conferred on the marker amplifier by the positive voltage pulse from condenser 43 on grid 45, results in a corresponding negative pulse at anode 46 of tube 40. This negative pulse, taken from anode 46 by conductor 47, is passed to the right over conductor 48 through condenser 49 to grid 61 of tube 60 (a 6SL7GT) and left over conductor 48' eventually to anode 71 of tube 70, another 6SL7GT. Tubes 60 and 70 control respectively the pulsing circuit, which occasions the horizontal sweep of the cathode-ray beam, and the timing circuit which produces the interval subdividing pulses 1 through 16 of Fig. 1.

To the vacuum tubes already or yet to be identified, the usual cathode heater supply is understood but not shown. The anode voltage supplies will be enumerated at the end of the functional description of the circuit.

So far in the operation of the circuit of the invention, the incoming marker pulse and succeeding channel pulses from the multiplex transmitter have produced, through the pulse amplifier (left section of tube 40), the marker selector (left section of tube 50) and the marker amplifier (right section of tube 40) a sharp negative voltage pulse at anode 46 of the marker amplifier. This negative pulse endures for the interval of conductivity of the marker amplifier, an interval which began when the voltage across condenser 43 rose to cancel the grid bias of the marker amplifier and ended with the passage of the marker pulse.

Inasmuch as it is required to subdivide the whole interval between ending 23 of marker pulse 21 and the beginning 24 of marker pulse 22, Fig. 1, it is necessary so to arrange matters that the pulser circuit shall purovide a cathode-ray sweep extending over more than one complete cycle of the marker pulse and the channel pulses following it. That is to say, the pulser circuit must be operated by the negative pulse from anode 46 of tube 40, corresponding to the reception of marker pulse 21, and remain operated until after the passage of marker pulse 22, soon thereafter returning to its quiet condition in readiness to be again operated by the arrival of the next marker pulse after pulse 22. At the same time the negative pulse from anode 46 operates the timing circuit to produce the interval subdividing or timing pulses which appear as equally spaced vertical deflections of the cathode-ray beam. It has been found desirable to make the number of these timing pulses an integral multiple, for convenience twice, of the number of channel pulses in each group received from the transmitter. For this purpose, the pulser circuit is designed to remain operated for 190 microseconds, leaving 60 microseconds for its recovery before the next marker pulse after 22 is received.

In pulser tube 60, the right section is cut off by the negative pulse transmitted to grid 61 through condenser 49 from anode 46 of tube 40. The circuit of tube 60 constitutes a one-shot overbiased multivibrator of conventional design. Control grid 61 is connected through condenser 62 to anode 63, anode 64 is connected through condenser 65 to grid 66 of the left section of tube 60. Condenser 65 is appropriately of 20 micromicrofarad capacity and with grid leak 67 of 180,000 ohms resistance determines the 190-microsecond operating interval of the multivibrator. Cathode resistor 68 of about 27,000 ohms resistance, provides grid biasing voltage for the two sections of tube 60, both of which are normally conducting. Anodes 63 and 64 are supplied, through 68,000-ohm resistors 63' and 64', respectively, from a 350-volt source which is also connected to grid 66 through 1-megohm resistor 67'. Grid 66 thus is about 50 volts positive to ground.

When the anode circuit of the right section of tube 60 is cut off, the potential of anode 64 rises to 300 volts. This rise is coupled, through 1-megohm resistor 81 and 0.01-microfarad condenser 82 to intensify grid 102 of cathode-ray oscilloscope 100 to brighten the trace on screen 20 during the operated interval of the multivibrator. A small capacity 83 shunting resistor 81 causes the pulse delivered to grid 102 to rise to full value in a few microseconds. The trace is thus made visible during the 190-microsecond sweep time and becomes invisible when anode 64 returns to its normal voltage at the end of that interval. The sweep, of which the generation will presently be described, is thus brightened for the interval of observation and blanked during the return of the beam.

Simultaneously, with the generation of this trace brightening pulse from anode 64 there appears at grid 66 of tube 60 a positive pulse transmitted from anode 64 through condenser 65. The ensuing increase in conductivity of the left section of tube 60 results in a negative pulse at anode 63, which is transmitted through 1,000-micromicrofarad condenser 51 to control grid 52 of the right section of tube 50, grounded through 1-megohm resistor 53. This section of tube 50 is the sweep generator and is cut off by the negative pulse on grid 52. Between its anode 54 and ground is connected 3,000-micromicrofarad condenser 55, which during the non-conducting interval of the sweep generator section is charged from a 350-volt power supply through a resistance path including the adjustable 2-megohm resistor 56. It is the charging of condenser 55, controlled in amount by adjustment of resistor 56, which provides a rising voltage to be amplified and provide the horizontal sweep voltage for horizontal deflecting plate 103 of oscilloscope 100. The scale of the horizontal excursion may, by adjustment of the voltage rise across condenser 55 be so varied that 2 inches on screen 20 represent from 20 to 125 microseconds in time. At the end of the 190-microsecond pulse of tube 60, condenser 55 discharges through the sweep generator section of tube 50 to a low voltage.

The voltage rise across condenser 55 is passed over conductor 57 through condenser 58, of 0.01-microfarad capacity, and 150,000-ohm resistor 59 to control grid 84 of sweep amplifier tube 80. Tube 80 is preferably a 12L8GT connected as a phase inverter to provide balanced sweep voltages to horizontal deflecting plates 103 of oscilloscope 100. Anodes 85 and 86 of tube 80 are supplied through resistors 87 and 88 respectively from a 350-volt source. Resistors 87 and 88 are respectively of about 80,000 ohms and 120,000 ohms, an arrangement which is known to improve the balance of the output voltages at anodes 85 and 86 when tube 80 is driven from an unbalanced voltage on grid 84.

From anodes 85 and 86, then, a balanced amplified sweep voltage is applied across plates 103. The horizontal sweep starts near the terminal instant of marker pulse 21, which accordingly is itself not shown on screen 20, and continues during the 190-microsecond interval fixed by the action of pulser tube 60, the scale of the sweep being determined by the adjustment of resistor 56.

The junction of condenser 58 and resistor 59 is grounded through 2-megohm resistor 94 in series with an adjustable portion of 1-megohm resistor 95 of which one end is grounded and the other end is connected to 350 volts. By a well-known effect, variation in the position of tap 96 on resistor 95 produces a left or right shift in the location of the pattern on screen 20. The office of resistor 59 is to limit the grid current flowing when grid 84 is positive, thus to limit the bias voltage which is built up across resistor 94, a bias voltage which might without this limitation become so great as to prevent complete control of the location of the screen pattern. By adjustment of tap 96, any desired channel pulse may be centered on screen 20, while by adjustment of resistor 56 the horizontal time scale may be expanded as previously described.

It is to be noted that strict time linearity of the horizontal sweep is not indispensable for the reason that by the timing circuit next to be described the interval between the end of marker pulse 21 and the beginning of marker pulse 22 is accurately subdivided by indicia relative to which the timing of the channel pulses may be observed. Grid 89 is maintained 26 volts positive to ground by means of voltage dividing resistances 97 and 97' across which 350 volts is applied to ground. This assures operation in the correct range for both sections of tube 80. The linearity of the sweep is improved by capacitative coupling between cathode 98 and screen grid 99 of tube 80.

The pulse interval of pulser tube 60 begins just prior to the end of marker pulse 21, at the instant at which condenser 43 has been charged to a potential overcoming the normal bias of grid 45 of tube 40. The duration of the pulse, 190 microseconds, is determined by the anode and grid voltages and the grid-to-anode coupling condensers of tube 60. Condenser 62, coupling grid 61 and anode 63, is of 250-micromicrofarad capacity, while grid 66 is connected to anode 64 through 20-micromicrofarad condenser 65. This condenser aids the trigger action but has little control of pulse duration. Resistors 67 and 68 are 180,000 ohms and 27,000 ohms, respectively.

From a 350-volt supply, anode 63 is supplied through 68,000 ohms, anode 64 through a similar resistance. The same 350 volts is applied through a 1-megohm resistance to grid 66 and through 3.3 megohms to grid 61. These constants fix the duration of the positive pulse appearing at anode 64 which brightens the trace on screen 20, and the negative pulse at anode 63 which results in starting the charging of condenser 55 to furnish the horizontal sweep voltage. There is left, before a third marker pulse arrives, an interval of 60 microseconds for the recovery of pulser tube 60, which, as before mentioned, is a single-shot multivibrator.

The first marker pulse cannot appear on screen 20, while the next marker does appear without influencing the pulser which it finds already in operation. After recovery of the pulser circuit the third marker is effective to repeat the cycle. Thus the pattern observed on screen 20 recurs with a frequency one-half that of the pulse groups from the multiplex transmitter.

Timing pulses, to appear as small triangular vertical deflecting voltages about 1-microsecond long, are instigated by the same negative pulse at anode 46 of tube 40 which set in operation the pulser circuit of tube 60. This negative pulse is transmitted over conductor 48' through 10,000-ohm resistor 34 to the junction of resistors 36 and 37 which form part of the resistance through which the 350-volt supply is fed to anode 71 of timer tube 70, preferably a 6SL7GT.

The circuit connections of tube 70 are as follows:

Between anode 71 and the 350-volt source are interposed in series 220,000-ohm resistor 35, resistor 36 (680 ohms) and resistor 37 (6,800 ohms). The junction of resistors 35 and 36 is capacitatively coupled to ground by 0.25-microfarad condenser 38 for the purpose of removing residual power supply ripple which would adversely affect the timing pulse regularity. Grid 72 is connected to the regulated 150-volt source through 10,000-ohm resistor 39 when switch S is closed left, as shown. Closing switch S to the right grounds grid 72, disconnecting it from resistor 39. When grid 72 is grounded, coupling from the marker pulse through tube 70 is prevented. Anode 73 is directly connected to grid 72. Anode 71 is coupled through 1,000-micromicrofarad condenser 74 to grid 75. The junction of condenser 74 with grid 75 is connected to the 150-volt source through 2.7-megohm resistor 76 and to ground through 220,000-ohm resistor 77. There results on grid 75 a positive potential of about 11 volts, so that this section of tube 70 is normally conducting. The two sections of tube 70 have separate cathodes, 17 and 18, for the left and the right section, respectively. Cathode 17 is grounded through 8,200-ohm resistor 19 shunted by a conventional by-pass condenser. Direct current feedback voltage across resistor 19 stabilizes the operation of tube 70. The timing pulses whose instigation will presently be described are oscillations of the resistance-capacity circuit connected between cathode 18 and ground. This circuit comprises condenser 25, 35 micromicrofarads, in parallel with an adjustable resistance comprising fixed resistor 26 in series with a variable portion of resistor 27. These resistors are of about 700,000 ohms and 500,000 ohms, respectively, and by varying the position of tap 28 on resistor 27 it is easy to control the frequency of the timing oscillations.

The negative voltage pulse from anode 46 of tube 40 generates a negative voltage across resistor 36, and this voltage is coupled through condenser 74 to grid 75 of tube 70. The left section of this tube then ceases to conduct. Its anode 73 and with it grid 72 rise together in potential to the 150 volts supplied through resistor 39, switch S being closed left. Now current flows in the right section of tube 70, charging positively condenser 25 until the voltage thereacross is about 153 volts, or enough to cut off this right section when grid 72 is 150 volts positive to ground. On the disappearance of the negative pulse from anode 46 of tube 40, current is reestablished in the left section of tube 70 and the potential of grid 72 falls.

Condenser 25 now discharges through resistor 26 and the selected portion of resistor 27, the discharge continuing until the potential of cathode 18 has fallen enough to allow current again to flow from anode 71 whereupon the potential of anode 71 and with it that of grid 75 falls and the left section is again cut off, causing the cycle just described to be repeated continuously.

Tube 70 is therefore a relaxation oscillator producing, with the circuit elements recited, short pulses of about 1-microsecond duration and recurrent at a frequency determined by the adjustment of tap 28. These pulses are manifested by triangular positive voltage pulses at grid 72, whence they may be transmitted to produce corresponding vertical deflections of the trace on screen 20. When switch S is closed right, no such oscillations are produced and the sweep on screen 20 is affected vertically only by the incoming pulse group to be observed.

The oscillations of the circuit of condenser 25 and its parallel resistance continue, whatever the adjustment of tap 28, until interfered with and restarted by the arrival of a new instigating negative pulse from anode 46 of tube 40. It is, of course, desired for the purpose the present invention serves, to make the timing oscillations subdivide into an integral number of parts the interval between the end of marker pulse 21 and the beginning of marker pulse 22, Fig. 1. Further, it is practically convenient to make the subdividing pulses in this interval twice the number of channel pulses therein, so that by adjustment of the multiplex transmitter one may arrange matters so that the first channel pulse coincides in its beginning with the first timing pulse, the second channel pulse with the third timing pulse, and so on as shown in Fig. 1.

The display of the channel pulses to be checked by the timing pulses just described is wholly conventional. From input terminals 30, the marker and channel pulses which proceed through condenser 31 to control the operation of the circuit described in the foregoing, proceed also through condenser 91 and resistance-capacity attenuator 200 (which is of conventional design) to be suitably simplified in vertical amplifier 210, which includes a 6AK5 tube. The pulses, positive at terminals 30, leave amplifier 210 as negative pulses and are applied to one of the grids of the phase inverter stage 220. This stage comprises a pair of 6AK5 tubes in a conventional phase inverting circuit, and it is convenient to introduce negative pulses representing the phenomenon to be examined into one phase of stage 220, while the positive timing pulses are introduced into the other phase of that stage. Positive timing pulses from grid 72 of timer tube 70 are transferred through condenser 101 to this other phase of stage 220. They are thus in appropriate phase relation to the marker and channel pulses and are of suitable amplitude with relation to the latter (which have been amplified as desired in amplifier 210) to emerge together as suitable inputs to push-pull amplifier 230.

Amplifier 230 comprises a pair of 6V6GT/G tubes, for which anode voltage is supplied from the 360-volt source through resistors 231 and 232.

Push-pull output pulses, the timing pulses together with the pulse groups to be observed, are passed through condensers 233 and 234 to vertical deflecting plates 104 of oscilloscope 100. The voltage level on which these pulses are superposed is derived from the regulated 350-volt supply through a voltage divider comprising resistors 235 and 236 in series, whereby a positive potential of 200 volts is impressed, directly on anode 105 of oscilloscope 100, and through resistors 237 and 238 on the respective vertical deflecting plates 104.

There remain to be described the voltage supplies not already specified. From any suitable source, say of rectified alternating current, 360 volts positive to ground is obtained and from it through another section of filter, a 350-volt supply is derived. From this in turn is obtained 150 volts regulated. The 360-volt potential is required for the screen grids of the two tubes of push-pull amplifier 230 and is applied directly to those grids and through resistors 231 and 232 to the corresponding anodes.

The regulated 350-volt potential is conductively conveyed to anode 71 of tube 70 through resistors 35, 36 and 37; from the junction of resistors 36 and 37 through resistor 34 to anode 46 of tube 40; to grid 66 of tube 60 through 1-megohm resistor 67'; to anodes 63, 64 of tube 60 each through 68,000 ohms and through 3.3-megohm resistor 61' to grid 61 of tube 60; and to anode 54 of tube 50 through resistors 56', 100,000 ohms, adjustable resistor 56 already mentioned and 220,000-ohm resistor 57'. 350 volts are also supplied to the conventional phase inverter stage 220 of the vertical amplifier and to vertical deflecting plates 104 and accelerating anode 105 of oscilloscope 100 in the manner already described.

The regulated 150-volt potential is conductively conveyed through resistor 76 to grid 75 and through resistor 39 (when switch S is closed left) to grid 72 of tube 70; through resistor 34' to anode 33 of tube 40; and through resistor 44' to grid 45 of tube 40 and to anode 44 of tube 50. It is also connected directly to the screen grid of tube 40 and through suitable resistance to the screen grids of tubes 50 and 80. In addition it is suitably supplied in conventional fashion to amplifier 210 and to phase inverter 220. Ground by-pass condensers are provided in various places in the conventional manner. Other resistances and capacities not specifically identified are those appropriate for the tubes used in the present circuit.

Between ground and the junction of condenser 82 with control grid 102 of oscilloscope 100, there is connected a series of five resistances, generally designated as 106. To the junction of the first and second of these remote from ground is connected a negative potential of 1700 volts, and by suitably adjusted taps on the second and fourth resistors are derived the required potentials for cathode 107 and focussing anode 108, respectively. These elements are those conventionally used, oscilloscope 100 being a 3BP1 type.

From the foregoing description it will be apparent that for a cathode-ray oscilloscope the circuit of the present invention provides a horizontal sweep voltage synchronized with every alternate one of successive groups of recurrent phenomena represented by voltage pulses, a sweep voltage lasting for one and one-half complete periods of their recurrence. At the same time the representative voltage pulses are themselves shown throughout the duration of the horizontal sweep by vertical deflections of controllable magnitude. The interval of observation may or may not, as desired, be subdivided by timing pulses which appear as vertical deflections synchronized with the beginning of each horizontal sweep and capable of dividing uniformly the recurrence interval. Moreover, whether or not the time subdividing indicia are superimposed on the vertical deflections representing the phenomena to be observed, there is provision for expanding the horizontal scale and for centering on the oscilloscope screen any desired instant in the interval of observation.

What is claimed is:

1. An electrical circuit for the study of recurrent trains of voltage pulses, each of said trains including a leading pulse distinguished from the succeeding pulses of the train, comprising a cathode-ray oscilloscope provided at least with a cathode, a control grid, pairs of horizontal and of vertical deflecting plates and a screen on which an electron beam from the cathode produces a spot positioned in accordance with voltages impressed on said plates, a power supply for said oscilloscope, means including thermionic devices for generating in synchronism with the leading pulse of every alternate one of said trains a voltage pulse on the control grid to brighten the spot during an interval at least greater than that between successive leading pulses of said trains, means including thermionic devices for generating simultaneously and coexistently with the brightening voltage a sweep voltage on the horizontal plates, means including thermionic devices for generating simultaneously and coexistently with the sweep voltage a series of timing voltage pulses on the vertical plates, means for controlling the frequency of said timing pulses, and means for applying to the vertical plates voltages representing the individual pulses of said trains in superposition on the timing pulses during the existence of the brightening voltage.

2. An electrical circuit as in claim 1 including means for controlling the magnitude attained by the sweep voltage coexistent with the brightening voltage.

3. An electrical circuit as in claim 1, including means for controlling the position on the screen at which the spot is vertically deflected by the voltage representing a desired one of said individual pulses.

4. An electrical circuit as in claim 1, including means for controlling the position on the screen at which the spot is vertically deflected by the voltage representing a desired one of said individual pulses and means for controlling the magnitude attained by the sweep voltage coexistent with the brightening voltage.

5. A circuit for inspecting the sequence of pulses in a pulse transmission system comprising a cathode-ray oscilloscope provided at least with a control grid, pairs of horizontal and of vertical deflecting plates and a screen on which an electron spot is positioned in accordance with voltages impressed on said plates, means synchronized with the initial pulse of every alternate sequence of said pulses for generating a voltage pulse on said control grid to brighten said spot during an interval at least equal to the interval between successive initial pulses of said sequence, means for generating simultaneously with said brightening voltage a sweep voltage on said horizontal plates, means for generating simultaneously with said sweep voltage a timing voltage on said vertical plates and means for applying to said vertical plates voltages representing the separate pulses of said sequence in superposition on said timing voltage.

6. An electrical circuit for the inspection of a regularly recurrent train of voltage pulses comprising a cathode-ray oscilloscope provided at least with a control grid, a pair of horizontal deflecting plates, a pair of vertical deflecting plates, and a screen on which an electron spot is varied in position in accordance with the voltages on said pairs of plates and in brightness in accordance with the voltage on said grid, means responsive to the pulses of said train for producing on the vertical plates deflecting voltages representing individually the pulses of said train, means controlled by said responsive means in synchronism with the initial pulse of every alternate recurrence of said train for generating a voltage pulse on the control grid effective to brighten the spot for a time interval at least as great as that between successive recurrences of said train and means controlled by said responsive means simultaneously with said last named means for generating a sweep voltage on the horizontal plates coexistent with said brightening pulse.

7. An electrical circuit as in claim 6 including means controlled by said responsive means simultaneously with said generating means to produce coexistently with the sweep voltage a series of timing voltage pulses of a desired frequency on the vertical plates.

8. An electrical circuit as in claim 6 including means associated with said sweep generating means for controlling the amplitude of the sweep voltage.

9. An electrical circuit as in claim 6 including means associated with said sweep generating means for locating in a desired position on the screen the vertical deflection representing a selected pulse of said train.

10. An electrical circuit as in claim 6 including, in association with said sweep generating means, means for controlling the amplitude of the sweep voltage and means for locating the vertical deflection representing a selected pulse of said train in a desired position on the screen.

JAMES O. EDSON.

REFERENCES CITED

The following references are of record in the file of this patent:

UNITED STATES PATENTS

| Number | Name | Date |
|---|---|---|
| 2,084,760 | Beverage | June 22, 1937 |
| 2,132,655 | Smith | Oct. 11, 1938 |
| 2,137,123 | Lewis et al. | Nov. 15, 1938 |
| 2,280,524 | Hansen | Apr. 21, 1942 |
| 2,312,761 | Hershberger | Mar. 2, 1943 |
| 2,313,966 | Poch | Mar. 16, 1943 |
| Re. 22,328 | Crosby | June 1, 1943 |
| Re. 22,390 | Lewis | Nov. 9, 1943 |